(12) United States Patent
Theis et al.

(10) Patent No.: US 10,096,119 B2
(45) Date of Patent: Oct. 9, 2018

(54) METHOD AND APPARATUS FOR DETERMINING A SHARPNESS METRIC OF AN IMAGE

(71) Applicant: THOMSON LICENSING, Issy les Moulineaux (FR)

(72) Inventors: Oliver Theis, Kalletal (DE); Axel Kochale, Springe (DE); Siegfried Schweidler, Gehrden (DE)

(73) Assignee: Thomson Licensing, Issy le Moulineaux (FR)

( * ) Notice: Subject to any disclaimer, the term of this patent is extended or adjusted under 35 U.S.C. 154(b) by 133 days.

(21) Appl. No.: 15/361,311

(22) Filed: Nov. 25, 2016

(65) Prior Publication Data

US 2017/0154434 A1  Jun. 1, 2017

(30) Foreign Application Priority Data

Nov. 26, 2015 (EP) .................... 15306875

(51) Int. Cl.
  *G06T 5/00* (2006.01)
  *G06T 7/00* (2017.01)
  *G06K 9/62* (2006.01)
(52) U.S. Cl.
  CPC ............ *G06T 7/0085* (2013.01); *G06K 9/623* (2013.01); *G06T 2207/30168* (2013.01)
(58) Field of Classification Search
  CPC ...... H04N 5/23212; G06T 2207/20192; G06T 2207/30168; G06T 7/13; G02B 7/36–7/365
  See application file for complete search history.

(56) References Cited

U.S. PATENT DOCUMENTS

| 5,790,269 A | 8/1998 | Masaki et al. |
| 7,190,395 B2* | 3/2007 | Nakano ................ H04N 1/4092 348/241 |
| 8,295,607 B1* | 10/2012 | Biswas .................. G06T 7/136 382/192 |
| 8,385,657 B2 | 2/2013 | Basri et al. |
| 2005/0002583 A1 | 1/2005 | Kondo et al. |

(Continued)

OTHER PUBLICATIONS

Srenivas Varadarajan et al., "An Improved Perception-Based No-Reference Objective Image Sharpness Metric Using Iterative Edge Refinement", IEEE publication, copyright 2008, pp. 401-404. (Year: 2008).*

(Continued)

*Primary Examiner* — Brian Werner
(74) *Attorney, Agent, or Firm* — Vincent E. Duffy

(57) ABSTRACT

In order to objectively and efficiently measure, visualize and evaluate the quality of images in terms of sharpness, a method for determining a sharpness metric (S) of an image is described. The method includes performing edge detection that results in gradients for the pixels of the image, determining a value representing a contrast metric C of the image, calculating at least three different thresholds ($t_1, t_2, t_3$) from the image content, and classifying the pixels according to their gradient into at least four groups defined by the thresholds. The sharpness metric (S) is calculated from relationships between the amounts of pixels in the different groups and a multiplicative factor (m) between the at least three thresholds.

15 Claims, 2 Drawing Sheets

(56) References Cited

U.S. PATENT DOCUMENTS

| | | | |
|---|---|---|---|
| 2006/0078217 A1* | 4/2006 | Poon | H04N 5/21212 |
| | | | 382/255 |
| 2006/0147125 A1* | 7/2006 | Caviedes | G06T 7/0004 |
| | | | 382/266 |
| 2010/0092100 A1 | 4/2010 | Madnani | |

OTHER PUBLICATIONS

Chern et al., "Practical issues in Pixel-Based Autofocusing for Machine Vision", 2001 IEEE International Conference on Robotics and Automation, Seoul, Korea, May 21, 2001, pp. 2791-2796.

Kamble et al., "No-reference image quality assessment algorithms: A survey", Optik, vol. 126, No. 11, 2015, pp. 1090-1097.

Mir et al., "An extensive empirical evaluation of focus measures for digital photography", Proceedings of SPIE, vol. 9023, Digital Photography X, Mar. 7, 2014, pp. 1-11.

Firestone et al., "Comparison of Autofocus Methods for Automated Microscopy", Cytometry, vol. 12, No. 3, 1991, pp. 195-206.

Ferzli et al., "A No-Reference Objective Image Sharpness Metric Based on the Notion of Just Noticeable Blur (JNB)", IEEE Transactions on Image Processing, vol. 18, No. 4, Apr. 2009, pp. 717-728.

\* cited by examiner

METHOD AND APPARATUS FOR DETERMINING A SHARPNESS METRIC OF AN IMAGE

REFERENCE TO RELATED EUROPEAN APPLICATION

This application claims priority from European Application No. 15306875.4, entitled "Method and Apparatus for Determining a Sharpness Metric of an Image", filed on Nov. 26, 2015, the contents of which are hereby incorporated by reference in its entirety.

FIELD

The present principles relate to a method for determining a sharpness metric of an image and an apparatus for determining a sharpness metric of an image.

BACKGROUND

There is a vital interest in many picture processing workflows, both for motion and still pictures, to objectively and efficiently measure, visualize and evaluate the quality of the picture in terms of sharpness. E.g. in image production workflows, production content can be evaluated at different stages down the line. The sharpness of an image is a matter of edge contrast and resolution. Image sharpness and contrast are important in differed domains of vision, e.g. human perception, image processing, image acquisition and image display. Generally, contrast is a measure of the difference between the darkest and brightest spot within an image. Different metrics for evaluating contrast in different applications are known. Most of them make prior assumptions about the image content. Known contrast types are e.g. Weber contrast, Michelson contrast and Root-Mean-Square (RMS) contrast. However, no solution is known for automatically determining a sharpness metric of an image. In particular, it would be desirable for various applications to express such sharpness metric as a numeric value.

SUMMARY

The present principles solve at least the above-mentioned problem. According to the present principles, at least three different thresholds for an image are calculated from the image content, edge detection is performed that results in gradients for the pixels of the image, and the pixels are classified according to their gradient into at least four groups defined by the thresholds. The sharpness metric is calculated from relationships between the amounts of pixels in the different groups and a multiplicative factor between the at least three thresholds.

Advantageously, the present principles can be used for various applications like measuring and visualizing image sharpness, measuring and visualizing image sharpening (ie. if and how much an image has been artificially sharpened) and others. A further advantage of the present principles is that the determined sharpness metric of an image is a single numeric value. This makes assessment results comparable, e.g. between two versions of an image from different sources or between different images. A further advantage of the present principles is that the sharpness metric is independent from the image content, since an automatic adjustment to the image is possible. Thus, a sharpness assessment can be made independent from image content, e.g. a comparison between images with very different content. Also, it is not necessary to make prior assumptions about the image content.

According to an embodiment, a method for determining a sharpness metric S of an image comprises performing edge detection on the image that results in gradients for the pixels, determining a contrast metric C of the image, calculating from the contrast metric C at least three different thresholds $t_1$, $t_2$, $t_3$, wherein the thresholds are related to each other by a constant factor m, and classifying the pixels according to their gradient into at least three groups defined by the thresholds: a first group has gradients above the first (ie. lowest) threshold $t_1$, a second group has gradients above the second threshold $t_2$, and a third group has gradients above the third (ie. highest) threshold $t_3$. Remaining pixels with gradients below the first threshold $t_1$ may be regarded as a fourth group. The sharpness metric is then calculated from the constant factor m between the thresholds, a relationship $S_2$ between the amounts of pixels in the second group and in the first group, and a relationship $S_3$ between the amounts of pixels in the third group and in the first group.

Further, in embodiments, the method further comprises calculating a contrast metric C as a weighted Root-Mean-Square (RMS) value $C_{WRMS}$ over pixels of the image, wherein pixels that according to the edge detection belong to an edge have higher weight than other pixels.

In an embodiment, an apparatus for determining a sharpness metric S of an image has elements as disclosed in claim 13.

In an embodiment, a computer readable storage medium has stored thereon executable instructions to cause a computer to perform a method for determining a sharpness metric of an image as disclosed in claim 1.

In an embodiment, a computer program for executing in a computing device, the computer program being stored on a storage medium, comprises instructions to cause a computer to perform a method for determining an image sharpness metric as disclosed in claim 1.

In an embodiment, an apparatus for determining a sharpness metric S of an image comprises at least one hardware processor and at least one non-transitory, tangible, computer-readable storage medium tangibly embodying at least one software component, wherein the software component when executing on the at least one hardware processor causes the processor to perform a method for determining an image sharpness metric as disclosed in 1.

Advantageous embodiments are disclosed in the dependent claims, the following description and the figures.

BRIEF DESCRIPTION OF THE DRAWINGS

Exemplary embodiments of the present principles are described with reference to the accompanying drawings, which show in FIG. 1 a flow-chart of a method for determining a sharpness metric of an image.

DETAILED DESCRIPTION OF PREFERRED EMBODIMENTS

Figure 1:
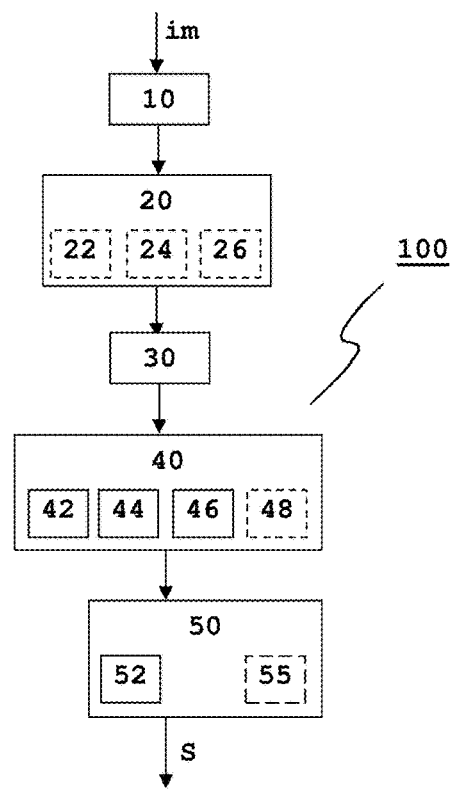

FIG. 1 shows a flow-chart of a method 100 for determining a sharpness metric S of an image im, in one embodiment.

The method 100 comprises performing 10 edge detection on the image, wherein gradient values are assigned to pixels, determining 20 a value representing a contrast metric C of the image (wherein results of said edge detection may but need not be used), and calculating 30 at least a first threshold $t_1$, a second threshold $t_2$ and a third threshold $t_3$ from the determined contrast metric C. The first, second and third thresholds are related by a constant factor m according to $t_1=C$, $t_2=m*t_1$ and $t_3=m*t_2$, wherein m is greater than one (m>1).

The method further comprises determining 40 amounts of pixels in different groups as defined by the thresholds, according to their gradient value. This includes determining 42 an amount of pixels having a gradient value of at least the first threshold $t_1$, which are referred to as first level edge pixels $B_1$, determining 44 an amount of pixels having a gradient value of at least the second threshold $t_2$, which are referred to as second level edge pixels $B_2$, and determining 46 an amount of pixels having a gradient value of at least the third threshold $t_3$, which are referred to as third level edge pixels $B_3$ herein. Then, the sharpness metric S is determined 50 from the constant factor m, a relationship $S_2$ between the amounts of second level and first level edge pixels and a relationship $S_3$ between the amounts of third level and first level edge pixels.

In a simple embodiment, this may be done, e.g., according to $$S = \frac{\sum B_2 - \sum B_3}{m \sum B_1},$$

wherein $B_1$ are the first level edge pixels, $B_2$ are the second level edge pixels and $B_3$ are the third level edge pixels. $\Sigma B_1$ denotes the total amount of first level edge pixels, $\Sigma B_2$ denotes the total amount of second level edge pixels etc. In a particularly advantageous embodiment, the sharpness metric S is calculated 52 according to $$S = \frac{S_2 + (m-1)S_3}{m} = \frac{S_2 - S_3}{m} + S_3,$$

with $S_2 = \sum B_2 / \sum B_1$ and $S_3 = \sum B_3 / \sum B_1$.

An advantage of this embodiment is that the resulting image sharpness metric S is normalized to a range of [0, . . . , 1]. This is advantageous in various applications, e.g. image processing flows. If $B_3$ is empty, $S_3=0$ and the image sharpness metric is in the range of [0, . . . , 1/m]. If all pixels are in $B_3$, then $S_3=1$ and $S=1$, ie. a sharpness of 100% is determined, due to $B_3=B_2=B_1$.

In a further advantageous embodiment, n thresholds $t_1, \ldots,$ are calculated, with n>3. In this case, the pixels are classified into n+1 bins or groups $B_0, B_1, \ldots, B_n$ (wherein $B_0$ with values below $t_1$ is not used) and the sharpness metric S is calculated 52 according to $$S = \frac{S_2 - S_3}{m} + \frac{S_3 - S_4}{m} + \ldots + \frac{S_{n-1} - S_n}{m} + S_3 = \frac{S_2 - S_n}{m} + S_n,$$

with $S_2 = \sum B_2 / \sum B_1, S_3 = \sum B_3 / \sum B_1, \ldots, S_n = \sum B_n / \sum B_1$.

Figure 4:
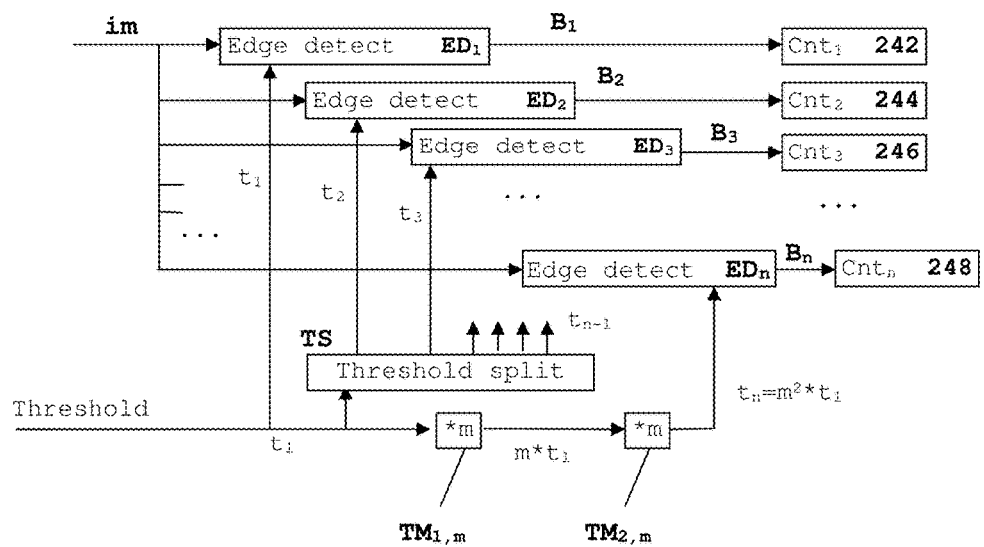
FIG. 4 the general structure of different edge detection blocks with different thresholds for n>3.

While more processing power is required for higher values of n, e.g. n=64 is a reasonable value. It is noted that in the case of n thresholds, the lowest and highest thresholds are the same as in the above-described embodiment with n=3, as shown in FIG. 4. That is, $t_{1,n=3}=t_{1,n>3}$ and $t_{3,n=3}=t_{n,n>3}$. Only the range between $t_1$ and $t_n$ is further split with n-2 thresholds, so that the total amount of thresholds and (used) bins is n. The n-2 thresholds between $t_1$ and $t_n$ may be distributed evenly such that $t_k=t_{k-1}*m'$, $2 \leq k \leq n-1$.

Thus, the final sharpness metric S is the same for n>3 as for n=3, but the granularity in the middle ranges is higher, which may be advantageous for various aspects of image analysis.

In one embodiment, the edge detection 10 provides a gradient g for a pixel, and the weight of the pixel is calculated according to the gradient g. The gradient or the weight may also be linearly scaled. In one embodiment, the weight w of the pixel is calculated according to w=g. In another embodiment, the weight w of the pixel is calculated according to $w=g^2$. In yet another embodiment, the weight w of the pixel is calculated according to $w=\sqrt{g}$. The relationship between the weight w and gradient g to be deployed may depend on the used edge detection 10 and be adapted to a range of gradients provided. E.g. if gradients are in the range [0, . . . , 1], a relationship of $w=\sqrt{g}$ amplifies low gradients (<0.25) stronger and thus leads to less elements in lower bins, while a relationship of $w=g^2$ amplifies low gradients (<0.5) less and thus leads to more elements in lower bins.

In an embodiment, the contrast metric C is a weighted Root-Mean-Square (RMS) value $C_{WRMS}$ over pixels of the image, wherein pixels that according to the edge detection belong to an edge have higher weight than other pixels. Thus, the contrast metric C is image adaptive. For example, in an embodiment, the weighted RMS value $C_{WRMS}$ is calculated 22 as a square root of a normalized weighted average of square deviations from a mean value $L_{mean}$ according to $$C_{WRMS} = \sqrt{\frac{\sum W(L - L_{mean})^2}{\sum W}}$$

where L denotes luminance values of pixels, W denotes the weights of the pixels, as obtained in the edge detection and being assigned to the pixels, and $L_{mean}$ is a sum of weighted luminance values divided by a sum of luminance values, according to $$L_{mean} = \frac{\sum L * W}{\sum W}.$$

In an embodiment, the weighted RMS value $C_{WRMS}$ is scaled 24 with a constant factor s greater than one to obtain a scaled weighted RMS value $C_{WRMS,s}$, wherein the clipped scaled weighted RMS value $C_{WRMS,s}$ is said contrast metric C of the image. Since the weighted RMS value $C_{WRMS}$ is normally in the range of [0, . . . , 0.5], the constant factor s should be at least 2. More advantageously for natural images, the constant factor s is about 4.71 (2*2.355), so that $C=2 \times 2.355 \times C_{WRMS}$. Small deviations are acceptable, e.g. s=[4.5, . . . , 5].

Advantageously, applying this factor s to the weighted RMS value stretches the resulting contrast values of typical natural images to the range [0, . . . , 1]. However, for non-typical images, such as images with strong contrast (such as, e.g., some artificially generated images), the resulting contrast value C can become greater than 1. Therefore, in an embodiment, the scaled weighted RMS value $C_{WRMS,s}$ is clipped 26 to a maximum value of $C_{max}=L_{max}-L_{min}$, where $L_{max}$ and $L_{min}$ are maximum and minimum luminance values respectively of pixels within the image. In this case, the clipped scaled weighted RMS value is said contrast metric C of the image. The mean value and contrast metric can also be used for other applications such as, for example, estimating luminance black and white levels in a camera by $L_{black}=L_{mean}-C/2$ and $L_{white}=L_{mean}+C/2$.

In one embodiment, the edge detection provides a gradient g for a pixel, and the weight w of the pixel is calculated according to $w=g^2$ for obtaining said weighted RMS value $C_{WRMS}$.

Typically, a good distribution is obtained if the constant factor m between the thresholds is m=2. In one embodiment, the constant factor m between the thresholds is substantially 2, e.g. in a range of [1.9, ..., 2.1].

In one embodiment, the sharpness metric S is assigned as metadata to the image, and stored separately or together with the image.

In one embodiment, the method further comprises calculating a fourth threshold $t_4$, which is related to the third threshold by said constant factor m according to $t_4=m*t_3$ (or, if n>3, $t_{n+1}=m*t_n$). Then, an amount of pixels having a gradient value of at least the fourth threshold $t_4$ (or $t_{n+2}$) is determined 48, which are referred to as fourth level edge pixels $B_4$ (or excess level pixels $B_{n+1}$) herein. Next, an oversharpness metric $S_4$ (or $S_{n+1}$) being a relationship between the amount of fourth level edge pixels and the amount of first level edge pixels is determined 55. Such oversharpness metric helps detecting images or portions of images that look unnatural, e.g. due to extensive artificial oversharpening. With this oversharpening metric, it becomes possible to determine such images or image portions automatically, which is advantageous in various image processing workflows performed in studios, e.g. VFX (virtual effects) processing etc.

In an embodiment, image processing is performed, based on the sharpness metric S, wherein pixels of the image are modified. For example, oversharp portions of an image may be slightly blurred in order to compensate the oversharpening.

In an embodiment, a camera is controlled based on the sharpness metric S (to correct image sharpness), wherein at least one of an exposure time, an aperture and an image sensing parameter of the camera is controlled.

Figure 2:
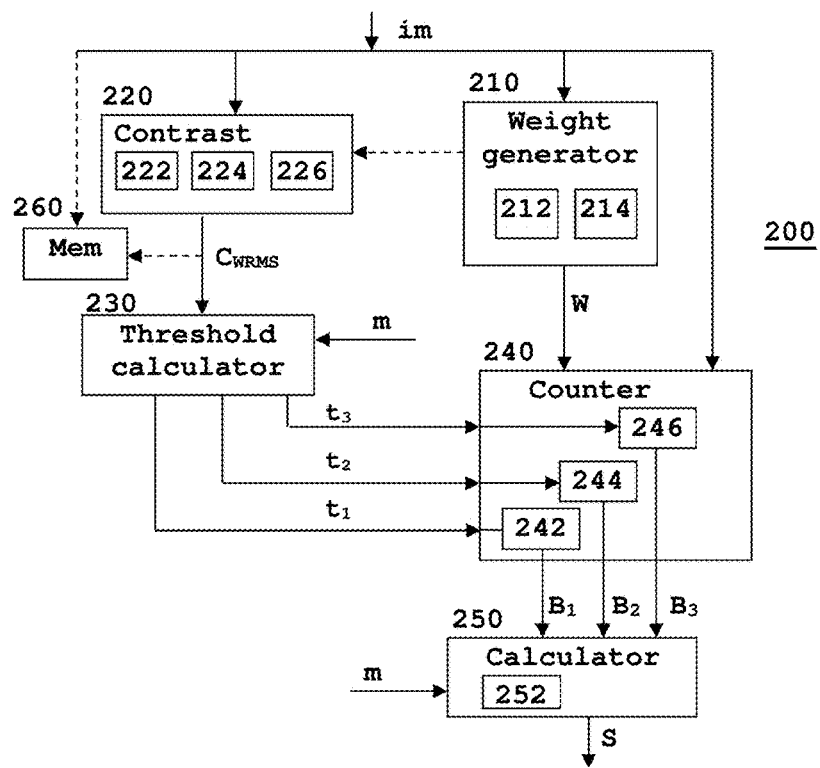
FIG. 2 a block diagram of an apparatus for determining a sharpness metric of an image.

FIG. 2 shows an apparatus 200 for determining a sharpness metric S of an image, in one embodiment. The apparatus 200 comprises circuitry implementing an weight generator unit 210 adapted for generating weights for pixels and assigning the weights to pixels, a contrast metric determining unit 220 adapted for determining a value representing a contrast metric C of the image (wherein results of said edge detection may but need not be used), a threshold calculating unit 230 adapted for calculating at least a first threshold $t_1$, a second threshold $t_2$ and a third threshold $t_3$ from the determined contrast metric C, wherein the first, second and third thresholds are related by a constant factor m according to $t_1=C$, $t_2=m*t_1$ and $t_3=m*t_2$, wherein m is greater than one (m>1), a counter unit 240 adapted for determining 42 an amount of first level edge pixels $B_1$ being pixels having a gradient value of at least the first threshold $t_1$, determining 44 an amount of second level edge pixels $B_2$ being pixels having a gradient value of at least the second threshold $t_2$, and determining 46 an amount of third level edge pixels $B_3$ being pixels having a gradient value of at least the third threshold $t_3$, and a calculation unit 250 adapted for determining 50 the sharpness metric S from the factor m, a relationship $S_2$ between the amounts of second level and first level edge pixels and a relationship $S_3$ between the amounts of third level and first level edge pixels.

In an embodiment, the weight generator unit 210 comprises an edge detection unit 212 adapted for performing 10 edge detection on the image and a weight calculation unit 214 adapted for calculating weights from the gradients and assigning the weights to pixels.

In an embodiment, the contrast metric determining unit 220 comprises a contrast metric calculator unit 222 adapted for calculating a weighted RMS value $C_{WRMS}$ from edge information, such as e.g. gradients of pixels, and a scaler unit 224 adapted for scaling the weighted RMS value $C_{WRMS}$ with a constant factor greater than one to obtain a scaled weighted RMS value $C_{WRMS,s}$, wherein the scaled weighted RMS value $C_{WRMS,s}$ is said contrast metric C of the image. In an embodiment, the weight generator unit 210 further comprises a clipping unit 226 adapted for clipping the scaled weighted RMS value $C_{WRMS,s}$ to a maximum value of $C_{max}=L_{min}$ with $L_{max}$ and $L_{min}$ being maximum and minimum luminance values respectively of pixels within the image, wherein the clipped scaled weighted RMS value is said contrast metric C of the image.

In an embodiment, the counter unit 240 comprises at least a first counter unit 242 adapted for determining 42 an amount of pixels having a gradient value of at least the first threshold $t_1$, the pixels being first level edge pixels $B_1$, a second counter unit 244 adapted for determining 44 an amount of pixels having a gradient value of at least the second threshold $t_2$, the pixels being second level edge pixels $B_2$, and a third counter unit 246 adapted for determining 46 an amount of pixels having a gradient value of at least the third threshold $t_3$, the pixels being third level edge pixels $B_3$. In an embodiment with n>3, the threshold calculator 230 may comprise a threshold splitting unit for generating thresholds between the lowest threshold $t_1$ and highest threshold $t_n$.

In an embodiment, the apparatus further comprises memory 260 adapted for storing the sharpness metric C and for associating it as metadata with the image.

In an embodiment, said calculation unit 230 is further adapted for calculating a fourth threshold $t_4$ being related to the third threshold by said constant factor m according to $t_4=m*t_3$. It may comprise a fourth counter unit 248 adapted for determining 48 an amount of pixels having a gradient value of at least the fourth threshold $t_4$, the pixels being referred to as fourth level edge pixels $B_4$. The calculation unit 250 may then be adapted for determining 55 an oversharpness metric $S_4$ being a relationship between the amount of fourth level edge pixels and the amount of first level edge pixels.

In an embodiment, an image processing system comprises the apparatus for determining a sharpness metric S of an image as disclosed above for performing image processing based on the sharpness metric S, wherein pixels of the image are modified. In another embodiment, a camera comprises the apparatus for determining a sharpness metric S of an image as disclosed above for controlling the camera based on the sharpness metric S (e.g. to correct image sharpness), wherein at least one of an exposure time, an aperture and an image sensing parameter of the camera is controlled.

In embodiments, the weight generator unit 210 comprises one or more processors adapted (e.g. programmed) for performing edge detection (e.g. Sobel, Prewitt, RMS etc.) or an interface adapted for retrieving results of such edge detection. Edge detection may also be performed by one or more filters, which may be hardware, software or a combination.

In embodiments, each of the above-mentioned units of the apparatus 200 may comprise hardware circuitry being configured and/or programmed to implement the respective unit described above.

Figure 3:
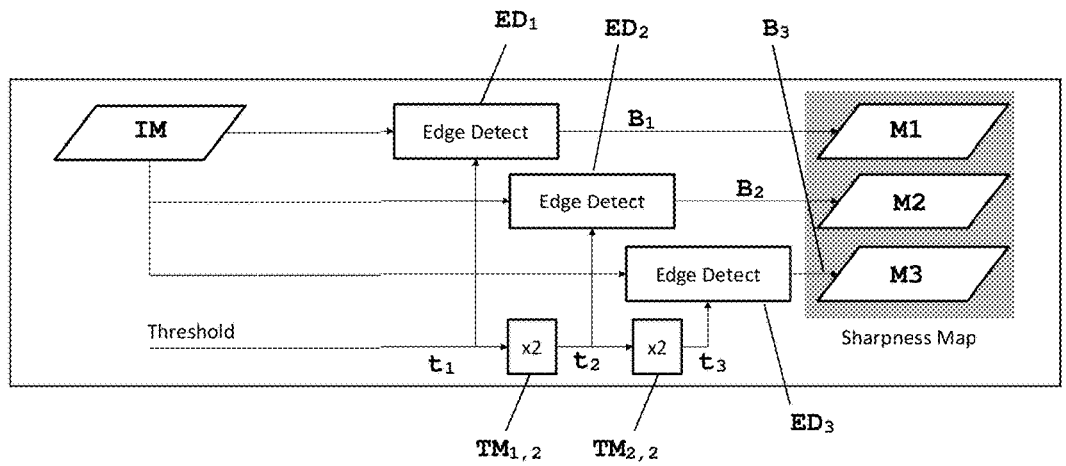
FIG. 3 the general structure of different edge detection blocks with different thresholds for n=3 and m=2.

FIG. 3 shows the general structure of different edge detection blocks, with different thresholds for n=3 and m=2. In this embodiment, the gradient of the pixels is directly used as their weight. A first threshold $t_1$ is received as input, and two further thresholds $t_2$, $t_3$ are obtained by multiplication with a constant factor of m=2 in two multipliers $TM_{1,2}$, $TM_{2,2}$. Each threshold is provided to an edge detector $B_1, B_2, B_3$. The edge detectors determine gradients (as weights) for pixels and provide on their output edge pixels, ie. pixels having a gradient above the respective threshold. In an embodiment, the output of the edge detectors is displayed on a display in the form of a sharpness map, where the outputs M1, M2, M3 of the edge detectors are differently colored and overlaid to each other. Thus, sharp areas, unsharp areas and oversharp areas of the image are easily visible for a user. It is also possible to calculate a sharpness metric S, as described above (not shown in FIG. 3).

FIG. 4 shows the general structure of different edge detection blocks with different thresholds for n>3. As in FIG. 3, a first threshold $t_1$ is received as input. However, only one further threshold $t_n$ is obtained as before, ie. by multiplication with a constant factor of m=2 in two multipliers $TM_{1,n}$, $TM_{2,n}$ (or a factor of $m^2$ in a single multiplier). The remaining n−2 thresholds $t_2, \ldots, t_{n-1}$ are obtained in a threshold splitter TS, which divides the range between the first and last thresholds $t_1$, $t_n$ evenly (e.g. linearly: $t_{k+1} = t_k +$ const with const being a constant value, or geometrically:

$$t_{k+1} = \sqrt[n-1]{m^2} \times t_k$$

with m>1). In this embodiment, the outputs of the edge detection blocks $B_1, \ldots, B_N$ are provided to counters $Cnt_1, \ldots, Cnt_N$, as described above for the calculation of a sharpness metric S (further steps for calculating a sharpness metric S are now shown here). It is also possible to display the results in the form of a sharpness map, as described for FIG. 3.

In an embodiment with a colored sharpness map M, a first edge map $M_1$ is generated for the first (lowest) threshold $t_1$, and displayed e.g. in red. A second edge map $M_2$ is generated for the second threshold $t_2$ and displayed e.g. in green. A third edge map $M_3$ is generated for the third (highest) threshold $t_3$ and displayed e.g. in blue. Since all pixels of the second edge map are also in the first edge map, and all pixels of the third edge map are also in the first and second edge maps, pixels are displayed brighter if they are sharper. Thus, the resulting edge map M gives color encoded visual clues about where sharp edges are located in an image. Only with this configuration, sharper edges are displayed by an increasing level of brightness/luminance (ie. levels are black, red, yellow, white with pixels of the third edge map displayed in white). An advantage of this color-mapping is that it does not require additional Look-Up-Tables.

Further, the sharpness map M can be modified to give visual clues about oversharpened edges, displayed e.g. in magenta or a different non-RGB color. For this purpose, a fourth edge map is calculated showing oversharp edges (that normally do not occur in images of a certain resolution) by using a threshold $t_4 = m^* t_3$. The respective edge map can be generated by:

$M = [B_{red}$ xor $(B_{green}, B_{magenta})$ $B_{blue}]$ where B denotes pixels with gradients above the respective above-mentioned thresholds. The sharpening metric $S_{magenta} =$ sum $(B_{magenta})/$sum $(B_{red})$ is suitable for storage as accompanying metadata of large still or motion picture sets for further evaluation.

In the structures shown in FIG. 3 and FIG. 4 it is possible to use only a single edge detection block $B_1$ instead of the plurality of edge detection blocks $B_1, \ldots, B_N$. Then, the result of the single edge detection block is compared with the at least three thresholds $t_1, \ldots, t_n$ in one or more comparison blocks.

The term "matrix" as used herein refers to a two-dimensional field of numbers. Thus, a "matrix" does not imply matrix operations in the sense of linear algebra. E.g., a multiplication of luminance values L with a weight matrix W means that each element of the luminance matrix L, ie. each pixel of the image, is multiplied with its respective weight w from the weight matrix W.

The use of the verb "comprise" and its conjugations does not exclude the presence of elements or steps other than those stated in a claim. Furthermore, the use of the article "a" or "an" preceding an element does not exclude the presence of a plurality of such elements. Several "means" may be represented by the same item of hardware.

As used herein, terms like "metric", "edge", "weight" etc. do not describe a mere mathematical abstraction, but instead denote information embodied in or carried by a physical medium capable of detection by a machine or apparatus. These terms include recorded or transmitted signals, and should be understood to include conveyance by any form of encoding, including but not limited to pulse code modulation (PCM).

The term contrast herein generally may refer to a metric with values in the range [0, ..., 1] for a luminance matrix L. The luminance matrix L comprises luminance values of pixels of an image.

While there has been shown, described, and pointed out fundamental novel features of the present principles as applied to preferred embodiments thereof, it will be understood that various omissions and substitutions and changes in the apparatus and method described, in the form and details of the apparatus disclosed, and in its operation, may be made by those skilled in the art without departing from the spirit of the present principles. Although the description discloses use of specific edge detection algorithms, one skilled in the art would recognize that any edge detection algorithms may be applied in the method and apparatus described herein. It is expressly intended that all combinations of those elements that perform substantially the same function in substantially the same way to achieve the same results are within the scope of the present principles. Substitutions of elements from one described embodiment to another are also fully intended and contemplated.

It will be understood that the present principles have been described purely by way of example, and modifications of detail can be made. Each feature disclosed in the description and (where appropriate) the claims and drawings may be provided independently or in any appropriate combination. Features may, where appropriate be implemented in hardware, software, or a combination of the two. Connections may, where applicable, be implemented as wireless (ie. over-the-air) connections or wired, not necessarily direct or dedicated, connections.

The invention claimed is:

1. A method for determining a sharpness metric (S) of an image (im), comprising
performing edge detection on the image, wherein gradient values are assigned to pixels;
determining a value representing a contrast metric C of the image;
calculating at least a first threshold $t_1$, a second threshold $t_2$ and a third threshold $t_3$ from the determined contrast metric C, wherein the first, second and third thresholds are related by a constant factor m according to $t_1=C$, $t_2=m*t_1$ and $t_3=m*t_2$, wherein m is greater than one;
determining an amount of pixels having a gradient value of at least the first threshold $t_1$, the pixels being first level edge pixels ($B_1$),
an amount of pixels having a gradient value of at least the second threshold $t_2$, the pixels being second level edge pixels ($B_2$), and
an amount of pixels having a gradient value of at least the third threshold $t_3$, the pixels being third level edge pixels ($B_3$); and
determining the sharpness metric S from the factor m, a relationship $S_2$ between the amounts of second level and first level edge pixels and a relationship $S_3$ between the amounts of third level and first level edge pixels.

2. The method according to claim 1, wherein the sharpness metric S is calculated according to $$S = \frac{S_2 + (m-1)S_3}{m} = \frac{S_2 - S_3}{m} + S_3,$$

with $S_2 = \sum B_2 / \sum B_1$ and $S_3 = \sum B_3 / \sum B_1$ wherein $B_1$ are the first level edge pixels, $B_2$ are the second level edge pixels and $B_3$ are the third level edge pixels.

3. The method according to claim 1, wherein the contrast metric C is a weighted Root-Mean-Square (RMS) value ($C_{WRMS}$) over pixels of the image, wherein pixels that according to the edge detection belong to an edge have higher weight than other pixels.

4. The method according to claim 3, wherein the weighted RMS value ($C_{WRMS}$) is calculated as a square root of a normalized weighted average of square deviations from a mean value $L_{mean}$ according to $$C_{WRMS} = \sqrt{\frac{\sum W(L - L_{mean})^2}{\sum W}}$$

where L denotes luminance values of pixels, W denotes weights obtained in said edge detection and being assigned to the pixels, and $L_{mean}$ is a sum of weighted luminance values divided by a sum of luminance values.

5. The method according to claim 3, wherein the weighted RMS value ($C_{WRMS}$) is scaled with a constant factor greater than one to obtain a scaled weighted RMS value ($C_{WRMS,s}$), wherein the clipped scaled weighted RMS value ($C_{WRMS,s}$) is said contrast metric C of the image.

6. The method according to claim 5, wherein the scaled weighted RMS value ($C_{WRMS,s}$) is clipped to a maximum value of $C_{max}=L_{max}-L_{min}$ with $L_{max}$ and $L_{min}$ being maximum and minimum luminance values respectively of pixels within the image, wherein the clipped scaled weighted RMS value is said contrast metric C of the image.

7. The method according to claim 3, wherein the edge detection provides a gradient g for a pixel, and the weight w of the pixel is calculated according to $w=g^2$ for obtaining said weighted Root-Mean-Square (RMS) value ($C_{WRMS}$).

8. The method according to claim 1, wherein the constant factor m is in a range of [1.9, . . . , 2.1].

9. The method according to claim 1, further comprising storing the sharpness metric C and assigning it as metadata to the image.

10. The method according to claim 1, further comprising calculating a fourth threshold $t_4$ being related to the third threshold by said constant factor m according to $t_4=m*t_3$;
determining an amount of pixels having a gradient value of at least the fourth threshold $t_4$, the pixels being fourth level edge pixels ($B_4$); and
determining an oversharpness metric $S_4$ being a relationship between the amount of fourth level edge pixels and the amount of first level edge pixels.

11. The method according to claim 1, further comprising performing image processing based on the sharpness metric S, wherein pixels of the image are modified.

12. The method according to claim 1, further comprising controlling a camera based on the sharpness metric S (to correct image sharpness), wherein at least one of an exposure time, an aperture and an image sensing parameter of the camera is controlled.

13. An apparatus for determining a sharpness metric (S) of an image (im), comprising
an weight generator unit adapted for generating weights for pixels and assigning the weights to pixels;
a contrast metric determining unit adapted for determining a value representing a contrast metric C of the image;
a calculating unit adapted for calculating at least a first threshold $t_1$, a second threshold $t_2$ and a third threshold $t_3$ from the determined contrast metric C, wherein the first, second and third thresholds are related by a constant factor m according to $t_1=C$, $t_2=m*t_1$ and $t_3=m*t_2$, wherein m is greater than one;
a counter unit adapted for determining an amount of first level edge pixels ($B_1$) being pixels having a gradient value of at least the first threshold $t_1$,
determining an amount of second level edge pixels ($B_2$) being pixels having a gradient value of at least the second threshold $t_2$, and
determining an amount of third level edge pixels ($B_3$) being pixels having a gradient value of at least the third threshold $t_3$; and
a calculation unit adapted for determining the sharpness metric S from the factor m, a relationship $S_2$ between the amounts of second level and first level edge pixels and a relationship $S_3$ between the amounts of third level and first level edge pixels.

14. The apparatus according to claim 13, wherein the sharpness metric S is calculated according to $$S = \frac{S_2 + (m-1)S_3}{m} = \frac{S_2 - S_3}{m} + S_3,$$

-continued $$\text{with } S_2 = \sum B_2 / \sum B_1 \text{ and } S_3 = \sum B_3 / \sum B_1$$

wherein $B_1$ are the first level edge pixels, $B_2$ are the second level edge pixels and $B_3$ are the third level edge pixels.

15. The apparatus according to claim 13, wherein the contrast metric C is a weighted Root-Mean-Square (RMS) value ($C_{WRMS}$) over pixels of the image, wherein pixels that according to the edge detection belong to an edge have higher weight than other pixels.

* * * * *